W. S. HARLEY.
VEHICLE FRAME.
APPLICATION FILED MAY 17, 1910.
978,881.
Patented Dec. 20, 1910.
3 SHEETS—SHEET 1.
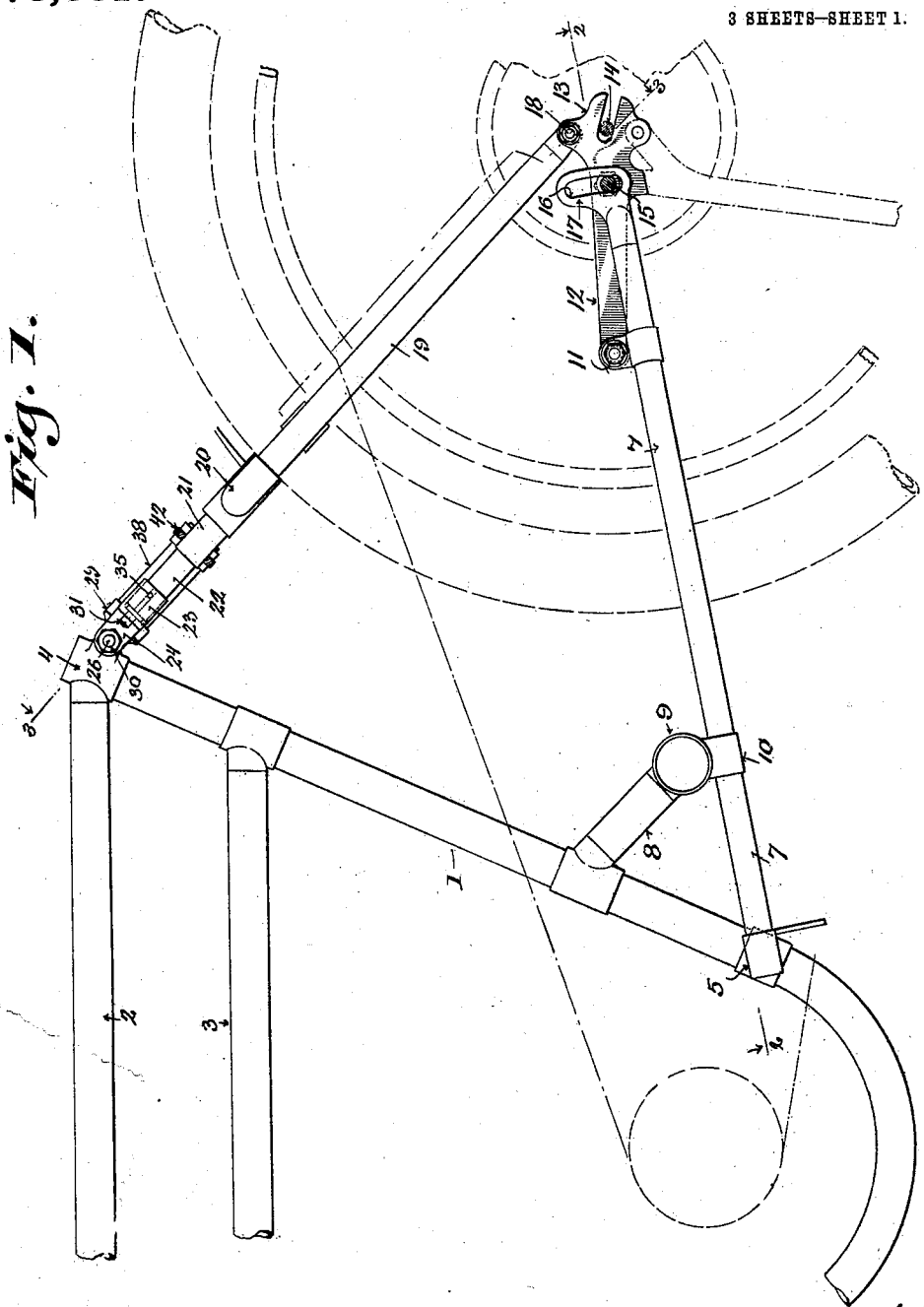

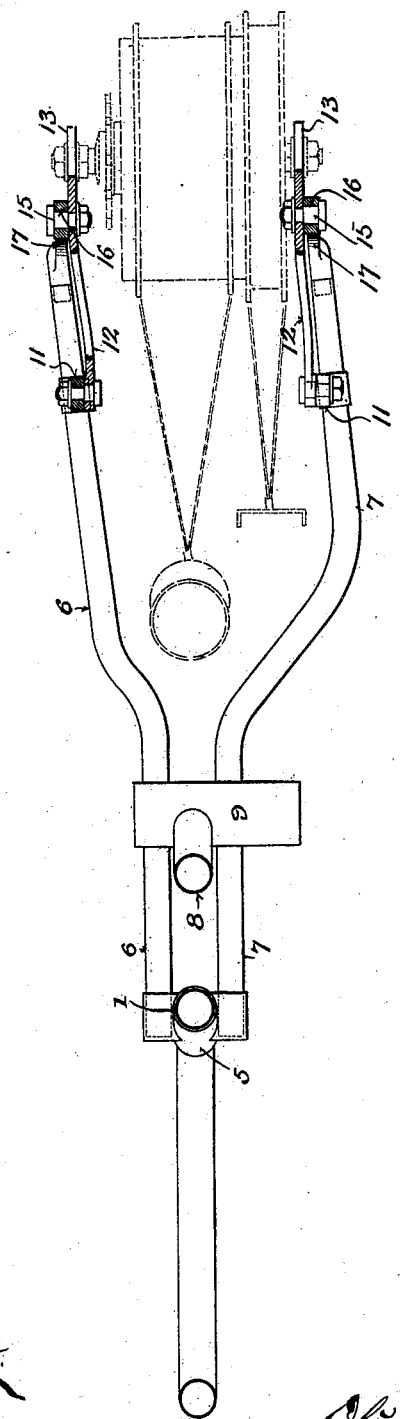

W. S. HARLEY.
VEHICLE FRAME.
APPLICATION FILED MAY 17, 1910.
978,881.
Patented Dec. 20, 1910.
3 SHEETS—SHEET 3.
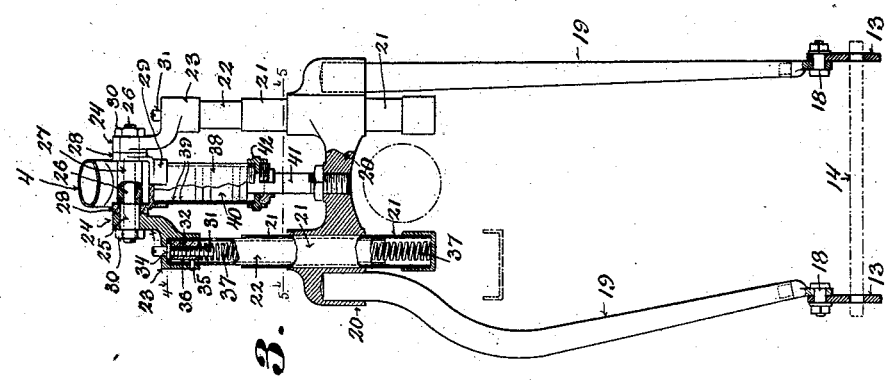

UNITED STATES PATENT OFFICE.

WILLIAM S. HARLEY, OF MILWAUKEE, WISCONSIN.

VEHICLE-FRAME.

978,881.  Specification of Letters Patent.  Patented Dec. 20, 1910.

Application filed May 17, 1910. Serial No. 561,793.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Vehicle-Frames; and I do hereby declare that the following is a full, clear, and exact description thereof.

The object of my invention is to provide a simple and effective spring connection for the rear fork of a frame particularly applicable to motorcycles or the like, the construction and arrangement being such that lateral rigidity is insured, while at the same time the fork will yield in opposition to spring pressure under shock, provision being also made for absorbing the recoil due to upward yield of said fork.

With the above objects in view the invention consists in certain peculiarities of construction and combination of parts to be fully set forth hereinafter with reference to the accompanying illustrations and subsequently claimed.

In the accompanying drawings Figure 1 illustrates a side elevation of a rear fork embodying the features of my invention, the fork, in this instance, being shown in connection with a portion of a motorcycle frame; Fig. 2, a detail sectional plan view of the same as indicated by line 2—2 of Fig. 1; Fig. 3, a detail rear elevation of the fork partly in section as indicated by line 3—3 of Fig. 1; Fig. 4, a detail cross-section as indicated by line 4—4 of Fig. 3, and Fig. 5, a detail cross-section as indicated by line 5—5 of Fig. 3.

Referring by characters to the drawings, 1 represents the seat mast of a frame having horizontally disposed upper and lower tubular brace bars 2, 3, respectively, the upper brace bar being in brazed connection with a saddle post frame of cluster bracket 4. Secured to the lower portion of the seat mast is a bracket 5 provided with sockets for the reception of the ends of rear fork members 6, 7, which members are also connected to the mast by a stay-brace 8, the lower end of which is secured to a horizontally disposed crank-hanger 9, that is brazed to the parallel fork members through connecting ears 10. Fulcrumed to ears 11 that extend from the rear portion of the fork members are links 12, the opposite ends of which links are formed with slotted heads 13 for the reception of the rear axle 14 of a traction wheel, as indicated by dotted lines in Figs. 1 and 2. The head ends of the links carry studs 15, which studs are fitted within slots 16 of guide ears 17 carried at the rear ends of the fork members 6 and 7.

By the above described connection between the fork members and links it will be seen that the same are free to rise and fall about their fulcrum, while at the same time they are held rigid in a lateral direction through their connection with the guide ears 17. Thus the rear wheel, which is carried by said links, is capable of oscillatory movement independent of the rear fork members.

Pintle bolts 18 extend from the link heads and serve as end supports for back stays 19, the upper ends of which stays are secured within sockets of a bridge bracket 20 that serves as a rigid connection therefor. The bracket 20 also carries a vertically disposed pair of parallel thimbles 21, and into telescopic connection with which, there is fitted a pair of sleeves 22. The sleeves 22 have heads 23 secured to their upper ends, the heads being provided with apertured lugs 24, which lugs are mounted upon spacing collars 25 that surround a stay-bolt 26, the stay-bolt being carried by an ear 27 of the seat-post cluster-bracket 4. Ears 28 of a cap 29 are also supported upon the collars 25, being interposed between the latter and the cluster-bracket ear aforesaid.

The assembled parts in connection with the stay-bolt are held by retainer nuts 30, which nuts are in screw threaded engagement with the ends of the bolt, as clearly shown in Fig. 3. A nut 32 is fitted within the upper portion of each sleeve 22, each nut being adjusted by means of a threaded spindle 31, the spindle being provided with a shoulder 34, that rests against the inner wall of the head 23, while a shank portion of the spindle extends through an aperture therein, whereby access is had to said spindle for the purpose of rotating the same in order that proper adjustment of the nut 31 may be had, said nut being held against rotation by a pin 35 that passes through the head and sleeve and projects into a longitudinal groove 36 of the nut. This nut is provided for the purpose of adjusting tension of a coiled spring 37, which is housed within said sleeve, having its opposite ends abutting the nut and bottom of the bridge thimbles respectively, it being understood that each thimble is equipped with this spring connection, whereby the rigidly connected rear stays 19 are in yielding telescopic connection with the seat mast, which yield is permitted through the toggle link connection with the rear fork members. Backlash due to the expansion of the springs after a sudden shock is absorbed, in this instance, through the medium of a fluid controlled dash-pot. The dash-pot comprises a cylinder 38 that is secured to the cap 29 at its upper end, which end is also provided with a vent aperture 39. Fitted within the cylinder is a suitably packed piston head 40, having a piston rod 41, that extends through a packing-head 42, which head is in screw-threaded connection with the lower end of said cylinder, the piston rod being adjustably secured to the bridge bracket 20 by means of a threaded connection and jam nut clearly shown in Fig. 3.

By utilizing a shock-absorber of the character just described, it will be seen that when the coiled springs are compressed, caused through upward movement of the stays 19, the piston will expel air contained in the cylinder through the vent apertures and just before the point is reached where the upward movement in opposition to the springs should be limited, the said piston closes the vents and thus forms a solid cushion of air at the terminal of the upstroke, to prevent a sudden jar due to the closing of the spring-coils. When the recoil takes place the air within the cylinder between the piston and packing head 42 will cushion the down stroke, the said air being slowly expelled by leakage between the head 42 and piston, whereby the parts will slowly assume their normal position and sudden shock in either direction is thus eliminated.

I claim:

1. In a vehicle frame having a seat mast and rear fork members secured thereto; the combination of links in toggle connection with the forks, back stays secured to the links, a bridge piece connecting the back stays, thimbles carried by the bridge piece, a stay-bolt secured to the seat mast, heads suspended from the stay-bolt, sleeves carried by the heads in telescopic union with the thimbles, coiled springs interposed between the heads and thimble bottoms, a cylinder suspended upon the stay-bolt intermediate of the heads, a piston head reciprocatively mounted within the cylinder, and a piston rod extending from the piston head rigidly secured to the bridge piece.

2. In a vehicle frame having a seat mast, rear fork members secured thereto, and guide ears extending from the rear ends of the fork members, the guide ears being provided with curved slots; the combination of ears projecting from the forks adjacent to their rear ends, links fulcrumed to the fork ears having slotted heads for the reception of an axle, studs extending from the head ends of the links engaging the guide ear slots of said fork members, back stays pivotally secured to the link heads, a bridge piece connecting the back stays, thimbles carried by the bridge piece, a stay-bolt secured to the seat mast, heads suspended from the stay-bolts, sleeves carried by the heads in telescopic union with the thimbles, and coiled springs interposed between the heads and thimble bottoms.

In testimony that I claim the foregoing I have hereunto set my hand at Milwaukee in the county of Milwaukee and State of Wisconsin in the presence of two witnesses.

WILLIAM S. HARLEY.

Witnesses:
MAY DOWNEY,
N. E. OLIPHANT.